US006607812B2

(12) United States Patent
Katori et al.

(10) Patent No.: US 6,607,812 B2
(45) Date of Patent: Aug. 19, 2003

(54) KEY SHEET

(75) Inventors: Masaya Katori, Tokyo (JP); Masayuki Kashino, Tokyo (JP)

(73) Assignee: Polymatech Co., Ltd. (JP)

( * ) Notice: Subject to any disclaimer, the term of this patent is extended or adjusted under 35 U.S.C. 154(b) by 59 days.

(21) Appl. No.: 09/774,756

(22) Filed: Jan. 31, 2001

(65) Prior Publication Data

US 2001/0051254 A1 Dec. 13, 2001

(30) Foreign Application Priority Data

Mar. 6, 2000 (JP) ....................................... 2000-061048

(51) Int. Cl.[7] ............................ B32B 3/00; H01H 13/14
(52) U.S. Cl. ........................ 428/207; 428/209; 200/341
(58) Field of Search ................................ 428/189, 187, 428/209, 201, 204, 203, 458, 461; 200/341, 302.2, 333, 512, 515

(56) References Cited

U.S. PATENT DOCUMENTS 4,501,936 A * 2/1985 Morse ..................... 200/302.2
4,528,428 A * 7/1985 Gotoh et al. ................ 200/5 A
5,176,945 A * 1/1993 Brayton ....................... 428/136
6,103,346 A * 8/2000 Nakajo et al. .............. 428/172
2002/0063109 A1 * 5/2002 Hayashizaki ................. 216/28

FOREIGN PATENT DOCUMENTS

JP 54-154461 12/1979
JP 7-54656 6/1995

* cited by examiner

*Primary Examiner*—Donald J. Loney
(74) *Attorney, Agent, or Firm*—McGlew and Tuttle, P.C.

(57) ABSTRACT

The present invention is a key sheet comprising a resin film wherein a mirror-like evaporation deposit layer is provided on a part or all of the back, and further a colored layer is provided at the back of the evaporation deposit layer, said resin film is integrated with the top face side of a button made of resin, allowing to realize a key sheet having all color metallic tones at a low cost, by making the optical concentration of the laminated portion of resin film and evaporation deposit layer 0.35 to 0.85.

7 Claims, 3 Drawing Sheets

KEY SHEET

BACKGROUND OF THE INVENTION

1. Technical Field of the Invention

The present invention concerns a compact and weight saved key sheet used for press-button switch of various cellular apparatus including mobile communication terminal such as cellular phone or car phone.

2. Related Art

Recently, the use of key sheet by the combination of resin film wherein a display section is printed on the back and buttons them-selves made of thermoplastic resin attracts attention in view of thinning, weight-saving or others.

As shown in FIG. 2, in its general composition, the key sheet integrates a resin film wherein a display section 2 of predetermined letter, numeral, symbol or code is disposed at the back, and a button 3 made of thermoplastic resin. The color of its display section is various such as black, gray or other achromatic colors, red, blue, green or other chromatic colors, gold, silver or other metallic tone and, in addition, the display section composition includes character printing type, outline character printing type or others. Concerning the manufacturing method of these key sheets, JP Pat. Appln. KOKAI Publication No. SHOU 54-154461, JP Pat. Publication No. HEI 7-54656 or others describe a method for integrally forming a resin film where the display section is printed and a thermoplastic resin by injection molding.

For the coloring of the display section with metallic tone, pearl tone or other metallic colors, largely desired for cellular phone or the like, the display section has been printed with an ink to which aluminum powder, pearl pigment or others are added.

However, when ink to which aluminum powder, pearl pigment or others are added, is printed on the resin film, it was difficult to obtain a mirror appearance that would be obtained by the metallic plating processing.

In addition, as another method for obtaining a metallic tone with mirror appearance, metal foil can be glued; however, in this manufacturing, as metal foil is adhered to the resin film back, and then the resin film is drawn into a predetermined shape and integrally formed with thermoplastic resin, the metal foil can not follow the resin film elongation, and cracks or others are provoked deteriorating the appearance. Moreover, the obtained metallic tone is mainly silver, and more wide variation has been desired. Further, it has also been required to provide a metallic tone with mirror-like appearance and illumination function by back-light at the same time.

SUMMERY OF THE INVENTION

The present invention intends to solve the aforementioned problems, and realizes metallic tones of any color at a low cost, by a composition providing an evaporation deposit layer having mirror-like gloss and transparence at the same time at the resin film back and, also providing a colored layer on the back of evaporation deposit layer, and by viewing the color of the colored layer through the resin film and the evaporation deposit layer.

In other words, it is a key sheet comprising a resin film wherein a mirror-like evaporation deposit layer is provided on a part or all of the back, and further a colored layer is provided at the back of the evaporation deposit layer, said resin film is integrated with the top face side of a button made or resin, characterized by that the optical concentration or density of the laminated portion of resin film and evaporation deposit layer is 0.35 to 0.85.

Moreover, it is a key sheet having the colored layer colored in a plurality of colors.

In the present invention, the optical concentration of the laminated portion of resin film and evaporation deposit layer is preferably 0.35 to 0.85.

If the optical concentration is less than 0.35, the evaporation deposit layer will lose the mirror appearance, and if it exceeds 0.85, the transparence will be lost and, moreover, the color of the colored layer laminated on the back of the evaporation deposit layer can not be recognized. More preferable range is 0.5 to 0.7.

The definition of optical concentration of the present invention is expressed by the common logarithm of the inverse of transmittance which is a ratio of incident light $I_0$ incident to the sample and transmitted light l that has passed through the sample, and the relation between the optical concentration and the transmittance is expressed as follows:

Optical concentration $$D=\log(l/T)=\log(I_0/I) \quad \text{expression (1)}$$

Transmittance $$T=I/I_0 \quad \text{expression (2)}$$

For instance, when the optical concentration D is 1.0, the transmittance T becomes 0.1, namely 10%, and when the optical concentration is 2, the transmittance becomes 0.01, namely 1%. When the optical concentration is 0.85, the transmittance becomes about 14%, and when the optical concentration is 0.35, the transmittance becomes about 45%.

DETAILED DESCRIPTION OF THE PREFERRED EMBODIMENTS

Now the present invention shall be described more in detail.

The present invention consists in, as shown in FIG. 1, a key sheet integrating a resin film 1 wherein a mirror-like evaporation deposit layer 4 is disposed at the key sheet back, and a top face side of a button 3 made of thermoplastic resin, wherein the optical concentration of the laminated portion of resin film 1 and evaporation deposit layer 4 is 0.35 to 0.85.

The key sheet allows to view from the surface, a color of a colored layer 5 disposed further back of the laminated portion of resin film 1 and evaporation deposit layer, except a display section 2.

For instance, the colored layer 5 is colored with red, yellow, green, blue, purple or white, the key sheet can be recognized respectively as red metallic tone, yellow red metallic tone, green red metallic tone, blue red metallic tone, purple red metallic tone or white red metallic tone.

Moreover, as shown in FIG. 3, the display section can be disposed between the laminated portion of resin film 1 and evaporation deposit layer 4.

In the present invention, the metallic tone color can be set arbitrarily by disposing a colored layer still back of the evaporation deposit layer and, moreover, as shown in FIG. 4, the metallic tone color can be changed easily, by changing the color of the colored layer for each button.

Different from the present invention, a technique for changing the metallic tone color is changed by a composition wherein a translucent colored layer is disposed at the back of the resin film, and a mirror-like evaporation deposit layer is disposed on the back of the colored layer may also be conceived; however, the metallic tone mirror-like appearance is darkened disadvantageously, even if a chromatic ink, for instance, so faint that the back side evaporation deposit layer can be view is used for the colored layer, and the obtained color variation is limited.

The resin film of the present invention is preferably a resin film of good transparency and 50 to 300 μm in thickness.

In the present invention, as the button surface is made of resin film surface, and the evaporation deposit layer representing a mirror-like appearance exists at the resin film back, the resin film is required to be transparent, and haze (haze: based on Japanese Industrial Standard K7105) is preferably equal to or less than 15%, so polyethylene terephthalate resin film, polycarbonate resin film, polyamide resin film having good transparency, or alloy film or the like containing at least one of them are appropriate. Among others, non-extended polyamide resin film is most preferable, because of its excellent extension characteristics and secondary processability such as deep drawing workability.

The material forming the evaporation deposit layer of the present invention is not particularly limited provided that the material metal or compound have a minor-like gloss; however, taking the heat resistance of resin film against heat applied for evaporation and cost into account, aluminum, chromium or other metals presenting relatively low fusing point are preferable.

The formation method of evaporation deposit layer of the present invention includes vacuum evaporation, ion plating, sputtering or other physical evaporation deposit methods, chemical evaporation deposit method using thermal/plasma chemical reaction for particular generation, electroplating depositing particle from solution, thermal spraying using plasma discharge or other methods and as for the manner of layer formation, the layer develops in island, or in layers. Among others, if the evaporation deposit layer is developed in island-shape by the vacuum evaporation method, crack, fissure or other undesirable inconvenience from the viewpoint of appearance shall not be generated on the evaporation deposit layer, when the resin film is drawn to a predetermined shape, and integrated with thermoplastic resin.

For the colored layer of the present invention, integrating resin film and button, it is preferable to use an ink having the adhesive function between the resin film and the button, selected conveniently from thermosetting type ink or UV setting type ink such as urethane base ink, acryl base ink, vinyl base ink, polycarbonate base ink, polyester base ink or the like.

The display section of the present invention can be formed as outline letter by etching the evaporation deposit layer. For etching, a method to dispose an outline letter shape protection layer by resist and remove evaporation deposit layer not covered with the protection layer by dipping in an alkali and acid aqueous solution, or an etching processing method using laser maker or the like.

Resin used for the button of the present invention is preferably transparent thermoplastic resin as for thermoplastic resin used for the integral molding and, polyethylene resin, polypropylene, polystyrene, polycarbonate resin, polyacryl acid resin, polymethacryl acid resin, polyamide resin or the like are used.

The key sheet manufacturing method of the present invention allows to obtain a key sheet having a mirror surface of an arbitrary color tone that can not be obtained by the printing conventionally, by applying surface treatment as necessary to the resin film, disposing an evaporation deposit layer to the resin film back by various evaporation deposit method, forming further a colored layer on the back of the evaporation deposit layer by printing, drawing the resin film into a button shape, and integrally molding by injecting thermoplastic resin into the button shaped cavity by injection molding.

The key sheet of the present invention, having surface of resin film, is excellent in friction resistance, and moreover, it can prevent rubbish or foreign matter from entering into the key sheet surface more than surface coating by painting known as conventional wear-resistant technique.

Now the present invention shall be described referring to embodiments. Note that all members such as resin film or ink described in the embodiment are representative, and not limited to them.

Embodiment 1

Figure 1:
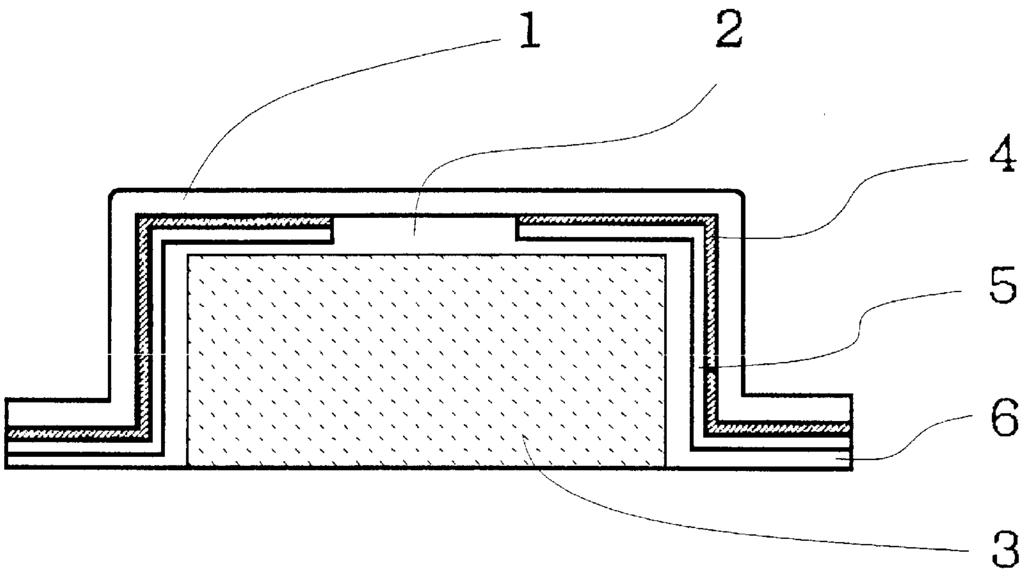
FIG. 1 shows cross section of a key sheet of the present invention.
Figure 2:
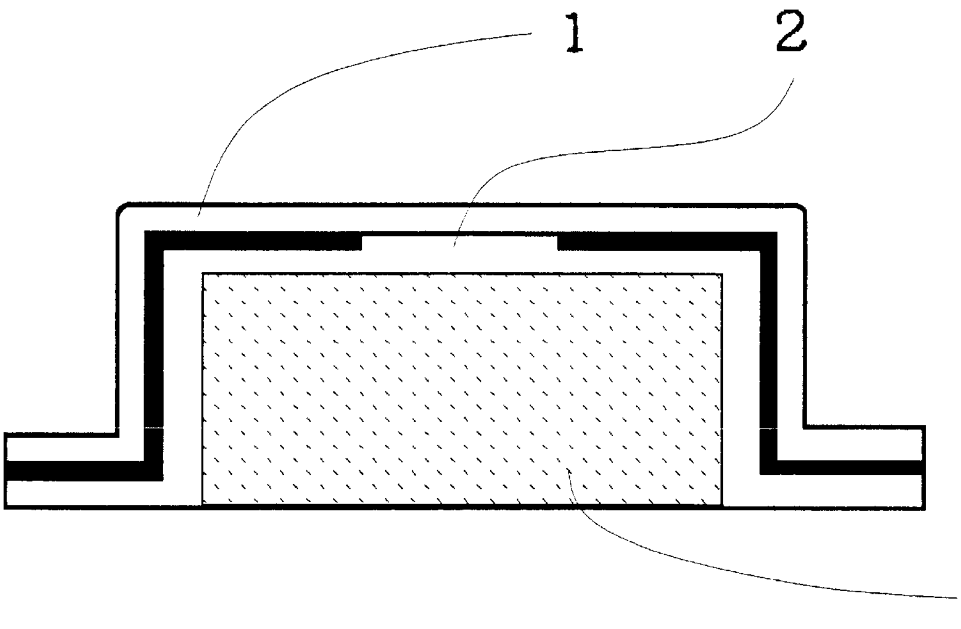
F I G. 2 PRIOR ART
FIG. 2 shows a cross section of a key sheet of the prior art.
Figure 3:
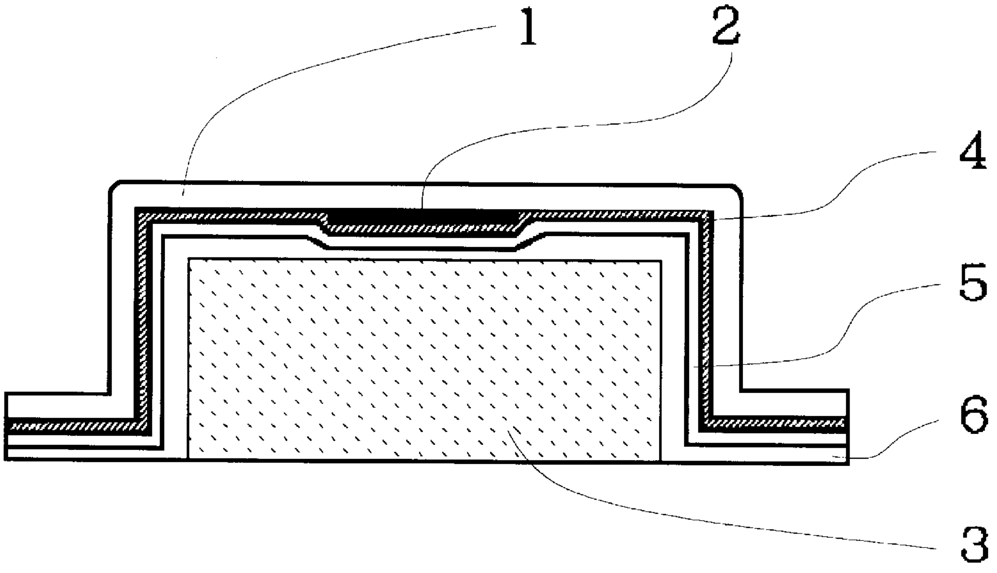
FIG. 3 shows a cross section of the key sheet of the present invention.
Figure 4:
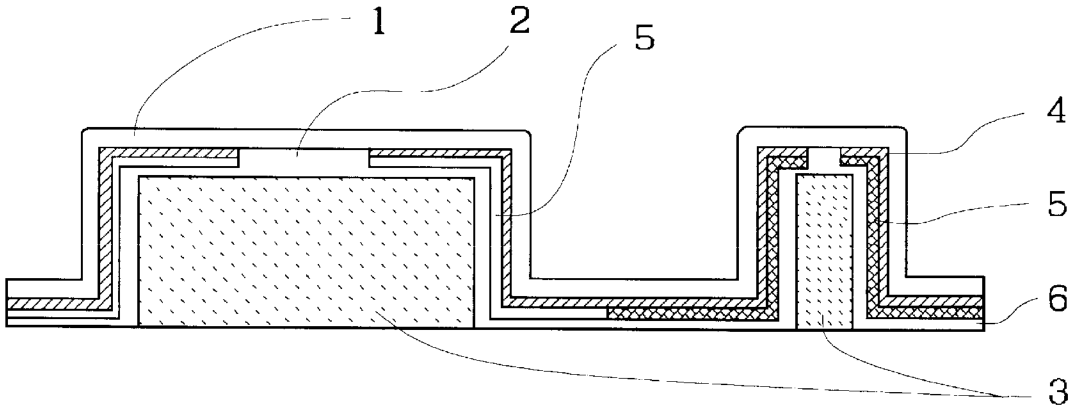
FIG. 4 shows a cross section of the key sheet of the present invention.

FIG. 1 shows a longitudinal section of the key sheet of the embodiment 1 of the present invention.

The surface of non-extended polyamide resin film 1 of 100 μm in thickness, extruded by T die method ("Diamiron C" made by Mitsubishi Plastics) is altered by the corona modifier made by Kasuga Denki. Rubbish and foreign matters are removed completely from this resin film surface before performing aluminum evaporation by batch type winding evaporation machine. At this time, optical concentration can be kept within a range of 0.35 to 0.85 by controlling the thickness of the evaporation deposit layer 4 within a range 10 to 20 nm.

This metal evaporated resin film is cut into a convenient size, and a yellow color colored layer 5 is formed in outline letter type on the evaporation surface by printing using urethane base ink ("RUX" made by Seiko Advance Ltd.). After a sufficient drying (80° C.×6 hours or longer), the resin film is dipped in 1% calcium hydroxide aqueous solution, and aluminum evaporation layer is removed from the outline letter portion where the colored layer is not formed, to form an outline letter shape display section 2. Further, the resin film is dipped in 1% sulfuric acid, neutralized and rinsed by dipping in a refined water, and then dried sufficiently. Thereafter, a colored layer 6 is printed with white urethane base ink ("RUX" made by Seiko Advance) in a way to cover all the surface. The resin film is drawn and deformed into a predetermined key shape by a compression molding die.

Polycarbonate, which is a thermoplastic resin ("Iupilon" made by Mitsubishi Engineering-Plastics Corporation) is injection molded into a key shaped cavity of the formed resin film by a injection molding machine made by NISSEI PLASTIC INDUSTRIAL CO., LTD. and, the resin film and button 3 made of resin are integrally molded. The outer periphery of the integrally molded product is cut by drawing, and a golden metallic tone outline letter type key sheet of the predetermined shape is obtained.

Embodiment 2

Figure 5:
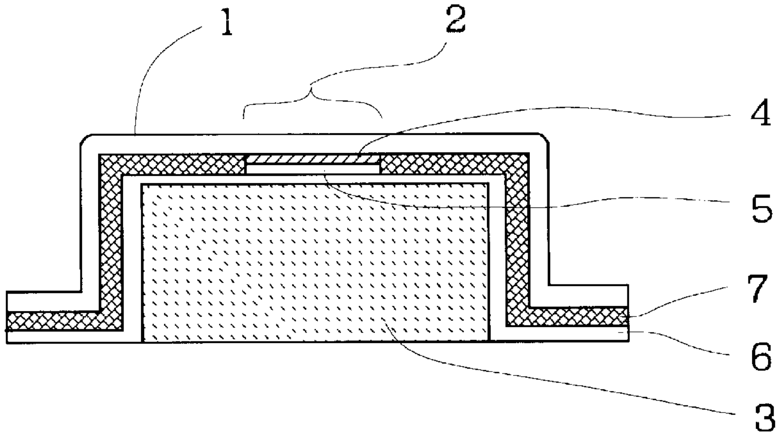
FIG. 5 shows a cross section of the key sheet of the present invention.

FIG. 5 shows a longitudinal section of the key sheet of the embodiment 2 of the present invention.

The surface of non-extended polyamide resin film 1 of 100 $\mu$m in thickness, extruded by T die method ("Diamiron C" made by Mitsubishi Plastics) is altered by the corona modifier made by Kasuga Denki. Rubbish and foreign matters are removed completely from this resin film surface before performing aluminum evaporation by batch type winding evaporation machine. At this time, the thickness of the evaporation deposit layer 4 is controlled similarly as in the embodiment 1.

The colored layer 5 is printed in the shape of a predetermined letter, numeral, symbol or code with well developing colors (red, yellow, blue) of urethane base ink ("RUX" made by Seiko Advance Ltd.) on the metallic evaporated resin film's evaporation surface. After being dried sufficiently, the resin film is dipped in 1% aqueous solution of potassium hydroxide to remove aluminum evaporation layer 4 of the portion other than previously printed predetermined letter, numeral, symbol or code shapes, to form the display portion 2.

Moreover, the resin film is dipped in 1% sulfuric acid and neutralized, and then it is dipped in a refined water to rinse, and dried sufficiently. Further, a black colored layer 7 and a white colored layer 6 are printed to shield the light. After a sufficient drying (80° C.×6 hours or longer), the resin film is drawn and deformed into a predetermined key shape by means of a compression molding die.

Polycarbonate, which is a thermoplastic resin ("Upiron" made by Mitsubishi Engineering-Plastics Corporation) is injection molded into a key shaped cavity of the formed resin film by a injection molding machine made by NISSEI PLASTIC INDUSTRIAL CO., LTD. and the resin film and button 3 made of resin are integrally molded. The outer periphery of the integrally molded product is cut by drawing, and a key sheet of the predetermined shape, and of letter illumination type is obtained, with letters of metallic tone of various colors.

Embodiment 3

Figure 6:
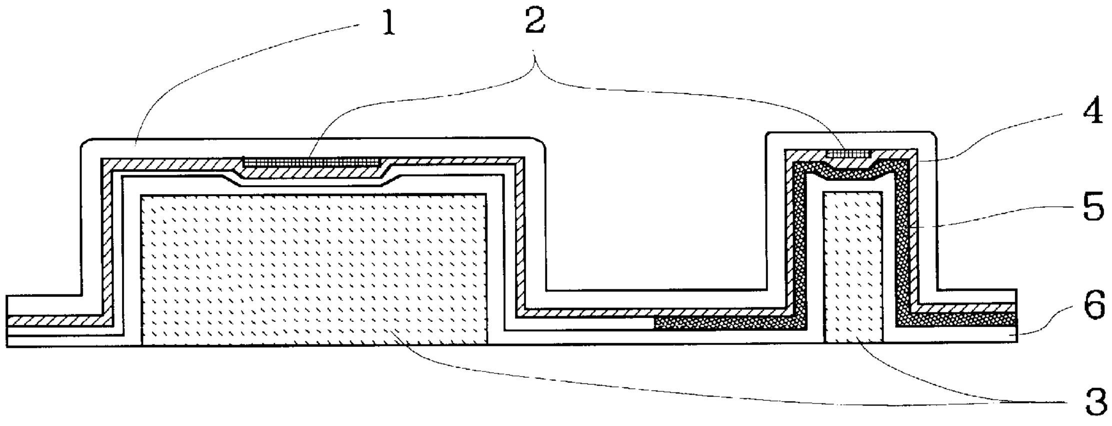
FIG. 6 shows a cross section of the key sheet of the present invention.

FIG. 6 shows a longitudinal section of the key sheet of the embodiment 3 of the present invention.

The surface of non-extended polyamide resin film 1 of 100 $\mu$m in thickness, extruded by T die method ("Diamiron C" made by Mitsubishi Plastics) is altered by the corona modifier made by Kasuga Denki. Rubbish and foreign matters are removed completely from this resin film surface before printing a predetermined letter, numeral, symbol or code shape by a winding type continuous printer using urethane base black ink ("RUX" made by Seiko Advance Ltd.) to obtain the display portion 2. Chromium evaporation of this resin film is performed by a batch type winding evaporation machine. At this time, the thickness of the evaporation deposit layer 4 is controlled similarly as in the embodiment 1.

A well developing colored layer 5 (red, yellow, blue or others) is formed by printing of urethane base ink ("RUX" made by Seiko Advance Ltd.) on the evaporation surface of this chromic evaporated resin film. After a sufficient drying (80° C.×6 hours or longer), the resin film is drawn and deformed into a predetermined key shape by a compression molding die.

Polycarbonate, which is a thermoplastic resin ("Iupilon" made by Mitsubishi Engineering-Plastics Corporation) is injection molded into a key shaped cavity of the formed resin film by a injection molding machine made by Nissei Resin Industry and a button 3 made of resin and the resin film are integrally molded. The outer periphery of the integrally molded product is cut by drawing, and a key sheet of ht predetermined shape is obtained with letter ground of various color metallic tones.

The key sheet of the present invention realizes a key sheet having metallic tones of any color at a low cost, by a composition providing an evaporation deposit layer having mirror-like gloss and transparence at the same time on the resin film back and, also providing a colored layer on the back of evaporation deposit layer, and by viewing the color of the colored layer through the resin film and the evaporation deposit layer. In addition, it can be combined without damaging the illumination function by backlight.

The evaporation deposit layer, disposed on the back of resin film, can not wear.

The present invention allows to realize freely metallic tone colors by printing usually used ink and, also, to have a plurality of color metallic tones in a key sheet, and is excellent in designing.

According to the present invention, the vacuum evaporation method being used, the laminated evaporation deposit layer follows the resin film elongation for the resin film drawing processing, the evaporation deposit layer will not crack (fissure), allowing to obtain a key sheet preferable from the viewpoint of appearance.

What is claimed is:

1. A key sheet comprising:

a resin film, said resin film being transparent;

an evaporation deposit layer having a metallic gloss, said evaporation deposit layer being provided on a part or the whole area of a back side of the resin film;

a colored layer provided on a back side of the evaporation deposit layer; and a button made of resin, said button having a top face side integrated with the resin film, wherein a laminated portion of the resin film and the evaporation deposit layer has an optical density of 0.35 to 0.85.

2. The key sheet of claim 1, wherein the colored layer has a plurality of colors.

3. The key sheet of claim 1, wherein the resin film is transparent and has a haze (haze: based on Japanese Industrial Standard K7105) equal to or less than 15%.

4. The key sheet of claim 1, wherein the evaporation deposit layer is made of aluminum or chromium.

5. The key sheet of claim 1, wherein the evaporation deposit layer has a thickness of 10 to 20 nm.

6. The key sheet of claim 1, wherein the evaporation deposit layer is made of aluminum and has a thickness of 10 to 20 nm.

7. A key sheet in accordance with claim 1, wherein:

said metallic gloss has a mirror-like gloss.

* * * * *